US012695595B2

(12) United States Patent
Bly et al.

(10) Patent No.: US 12,695,595 B2
(45) Date of Patent: Jul. 28, 2026

(54) CIPHERTEXT HEADER-BASED DATA SECURITY

(71) Applicant: T-Mobile Innovations LLC, Overland Park, KS (US)

(72) Inventors: Terri Bly, Kirkland, WA (US); Sanjay Garothaya, Ashburn, VA (US); Mohammad Muntasir Nur, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 161 days.

(21) Appl. No.: 18/670,692

(22) Filed: May 21, 2024

(65) Prior Publication Data

US 2025/0365129 A1 Nov. 27, 2025

(51) Int. Cl.
| | |
|---|---|
| *H04L 29/06* | (2006.01) |
| *G06F 21/62* | (2013.01) |
| *H04L 9/06* | (2006.01) |
| *H04L 9/08* | (2006.01) |

(52) U.S. Cl.
CPC ........ *H04L 9/0618* (2013.01); *G06F 21/6218* (2013.01); *H04L 9/0822* (2013.01)

(58) Field of Classification Search
CPC .. H04L 9/0168; H04L 9/0822; G06F 21/6218
See application file for complete search history.

(56) References Cited

U.S. PATENT DOCUMENTS

| | | | | |
|---|---|---|---|---|
| 9,298,940 | B1 * | 3/2016 | Paris | H04L 63/0435 |
| 2020/0127983 | A1 * | 4/2020 | Asghar | H04L 9/0819 |
| 2022/0247554 | A1 * | 8/2022 | Peddada | H04L 9/0897 |
| 2023/0409731 | A1 * | 12/2023 | Voelker | H04L 9/0894 |

OTHER PUBLICATIONS

Bly, Terri, "Systems and Methods for Rule-Based Database Management and Tagging," filed Dec. 12, 2024, U.S. Appl. No. 18/979,590.
Bly, Terri, et al., "Methods and Systems for Data Platform Monitoring and Auditing," filed Mar. 28, 2024, U.S. Appl. No. 18/620,519.

(Continued)

*Primary Examiner* — Jason K Gee

(57) ABSTRACT

Methods for landing encrypted data in a column, requesting access to decrypted data, and storing multiple data sets in a single column with different encryption schemes based on utilizing cryptographic key and algorithm identifiers in ciphertext headers. The methods comprise an application of a storage system receiving an access request to encrypt data to or decrypt data from (respectively) a database of the storage system. Next, the application determines whether the external source is permitted to encrypt to or decrypt from the database based on external source identifiers and permissions specified in an active directory of the storage system. When the external source is authenticated (i.e., permitted), performing the appropriate steps to write encrypted data by adding to ciphertext headers cryptographic key and algorithm identifiers or read decrypted data by obtaining cryptographic key and algorithm identifiers from ciphertext headers.

20 Claims, 6 Drawing Sheets

(56)          References Cited

OTHER PUBLICATIONS

Office Action dated Feb. 23, 2026, U.S. Appl. No. 18/620,519, filed Dec. 12, 2024 [IDF P21308US01_4900-09300].

Equivalent_Pop0, Tmobile Customer Service, 2022, Reddit, 10 pages (Year: 2022).

T-Mobile, Simplify workforce management and increase efficiency, Feb. 23, 2024, T-Mobile, 5 pages (Year: 2024).

T-Mobile, Prepaid account suspend & cancellations, Dec. 9, 2023, T-Mobile, 2 pages (Year: 2023).

* cited by examiner

100

CIPHERTEXT HEADER-BASED DATA SECURITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Encryption and decryption algorithms are components of cryptography—aiding in the security and privacy of sensitive data. Encryption algorithms may scramble data using secret keys, while decryption algorithms may reverse the process using the same secret keys. The combination of these algorithms may provide a useful tool for protecting information from unauthorized access and maintaining data confidentiality.

The field of cryptography is developing to address the evolving security landscape. Encryption algorithms, hardware-based encryption, self-encrypting drives, key management systems, and cloud-based encryption solutions are some aspects of safeguarding sensitive data. As technology progresses, more robust and secure encryption solutions are expected to emerge, enhancing the protection of valuable information in the digital age.

SUMMARY

In an embodiment, a method for maintaining a database comprising a plurality of distinctly managed columns on a storage system is disclosed. The method comprises receiving, by an application of the storage system, a first encrypt access request comprising a first data set to be written to the database. The method further comprises encrypting, by the application, the first data set using a first encryption algorithm based on a first encryption key to obtain a first ciphertext. The method further comprises adding, by the application, a first header to the first ciphertext, wherein the first header comprises a first encryption key identifier identifying the first encryption key and a first encryption algorithm identifier identifying the first encryption algorithm. The method further comprises writing, by the application, the first ciphertext to a column in the database. The method further comprises receiving, by the application, a second encrypt access request comprising a second data set to be written to the column of the database. The method further comprises encrypting, by the application, the second data set using a second encryption algorithm based on a second encryption key to obtain a second ciphertext, wherein the second encryption algorithm and the second encryption key are different from the first encryption algorithm and the first encryption key. The method further comprises adding, by the application, a second header to the second ciphertext, in which the second header comprises a second encryption key identifier identifying the second encryption key and a second encryption algorithm identifier identifying the second encryption algorithm, and in which the second encryption algorithm identifier and the second encryption key identifier are different from the first encryption algorithm identifier and the first encryption key identifier. Additionally, the method comprises writing, by the application, the second ciphertext to the column in the database.

In another embodiment, a method for managing, authorizing, and decrypting data stored across a set of distinctly managed columns in a database of a storage system is disclosed. The method comprises receiving, by an application of the storage system from an external source, a decrypt access request for a data entry comprising ciphertext to be read from the database. The method further comprises determining, by the application using an active directory of the storage system, whether the external source is permitted to decrypt the data entry from the database based on an external source identifier and an external source permission, wherein the active directory comprises identifiers of a plurality of external sources and corresponding permissions associated with the plurality of external sources. When the external source is permitted to decrypt the data entry from the database, the method further comprises reading, by the application, the ciphertext from a column in the database. The method further comprises obtaining, by the application, a decryption key identifier and a decryption algorithm identifier from a header of the ciphertext. The method further comprises decrypting, by the application, the data entry from the ciphertext using a decryption algorithm identified by the decryption algorithm identifier based on a decryption key identified by the decryption key identifier. Additionally, the method comprises transmitting, by the application, the data entry to the external source.

In yet another embodiment, a method for managing, authorizing, and encrypting data to be stored across a set of distinctly managed columns in a database of a storage system is disclosed. The method comprises receiving, by an application of the storage system from an external source, an encrypt access request comprising a data entry to be written to the database. The method further comprises determining, by the application using an active directory of the storage system, whether the external source is permitted to access an encryption key to encrypt the data entry to the database based on an external source identifier and an external source permission, wherein the active directory comprises identifiers of a plurality of external sources and corresponding permissions associated with the plurality of external sources. When the external source is permitted to access the encryption key to encrypt the data entry to the database, the method further comprises encrypting, by the application, the data entry using an encryption algorithm based on the encryption key to obtain ciphertext. The method further comprises adding, by the application, a header to the ciphertext, wherein the header comprises an encryption key identifier identifying the encryption key and an encryption algorithm identifier identifying the encryption algorithm. Additionally, the method comprises writing, by the application using an insert command, the ciphertext to a column in the database.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
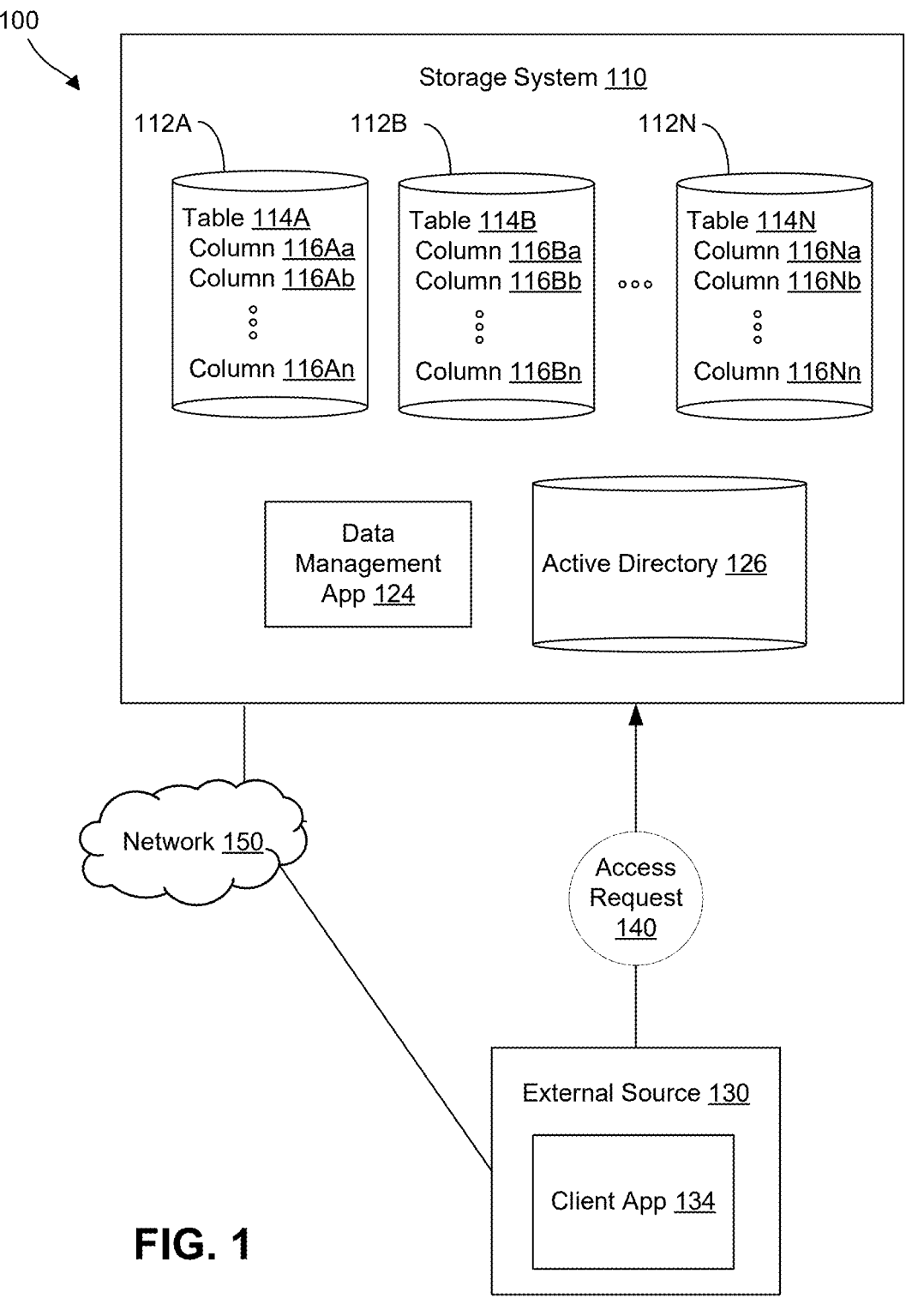
FIG. 1 is a block diagram of a system according to an embodiment of the disclosure.

It should be understood at the outset that although illustrative implementations of one or more embodiments are exemplified below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In the realm of cryptography, encryption and decryption processes aim to protect sensitive data by transforming the sensitive data from a readable format (plaintext) into an unreadable format (ciphertext) and vice versa. Data encryption and decryption may be performed based on various types of algorithms. An encryption algorithm is a set of mathematical instructions that define how to transform plaintext into ciphertext utilizing one or more encryption keys to scramble the data such that the data may not be read or decrypted without the corresponding key. A key in cryptography is essentially a "secret" code that allows authorized users to access encrypted information while keeping it inaccessible to unauthorized users. A decryption algorithm may be considered the reverse of an encryption algorithm. The decryption algorithm may be a set of mathematical instructions that, when executed, transform ciphertext back into plaintext. The decryption algorithm may utilize the same "secret" codes (i.e., decryption keys) used for encryption to reverse the scrambling process. Decryption algorithms may be designed to only work with the correct decryption key.

In this way, ciphertext may refer to the output of the encryption algorithm applied to plaintext using a cryptographic algorithm or encryption method. In the context of information security and cryptography, plaintext refers to the original format of data prior to encryption, while ciphertext is the scrambled or encoded form of that data after encryption has been performed on the data. Ciphertext is typically composed of a series of characters, which may be letters, numbers, and special symbols, and the ciphertext may appear unintelligible without knowledge of the encryption key or encryption algorithm.

Ciphertext headers, also known as encryption headers, may refer to metadata that accompany encrypted data. Ciphertext headers may provide essential information about the encryption process and the encrypted data. For example, ciphertext headers may include encryption mode, initialization vector (IV), ciphertext length, Message Authentication Code (MAC), and padding.

Key management may be useful in cryptography to help ensure that encryption and decryption keys are properly generated, stored, and protected from unauthorized access. Key management systems (KMS) may provide a centralized platform for managing encryption and decryption keys, including key generation, storage, distribution, and revocation. Managing a large number of encryption keys can become complex, especially in large organizations with diverse data security requirements. Not only may this complexity be computationally inefficient and resource-intensive from a processing power standpoint, but it can also lead to errors and mismanagement of keys, increasing the risk of data exposure. Such challenges are generally addressed inadequately at an organizational level by implementing centralized KMSs to provide a unified platform for managing all encryption keys across the organization, automating key management tasks to reduce human error and inefficiency, and enforcing strict access controls to restrict access to encryption keys.

The growing adoption of cloud computing and the increasing sophistication of cyberattacks may drive the development of new encryption strategies to protect data in cloud environments and against advanced threats. More specifically, some cloud-based storage systems may perform column-level encryption on data, in which certain columns are encrypted according to a particular encryption scheme using particular encryption keys, instead of encrypting an entire database according to the specific encryption scheme. When some of the encrypted data, including the encryption key, is breached, the data in the entire column may be compromised. In this type of scenario, known as key rollover, a new encryption key may need to be introduced into the column, so new data landing into the column is encrypted according to the new encryption key. However, old data from the same column may still remain encrypted according to the old encryption key, which may be problematic when access requests are received for data in the column, for example, because if two keys exist and are not distinguishable as old or new, a decryption algorithm may fail to properly function and encrypted data may no longer be consistent.

Data re-encryption may sometimes be performed to solve the foregoing problem to re-encrypt data in a column that was previously encrypted with an old encryption key. Data re-encryption may involve disabling of data flow into the column, re-encrypting all of the previously encrypted data using a new encryption key, and then re-enabling data flow in the column. For example, if an encryption key was compromised, all data encrypted with that key was vulnerable to decryption by the attacker. Therefore, data re-encryption may involve the complete halting of storage system data flow functionality while re-encrypting data with a new, secure key. For this reason, data re-encryption may not be considered an efficient method to "roll over" associated encryption or decryption keys. If a key is compromised, key rollover and re-encryption may both need to occur.

Stopping data flow into the column causes inefficiencies and may also result in various types of technical problems. For example, data received at the database for entry in the column may remain in a queue for an extended period of time, causing a delay and other latencies in the storage and processing of data at the database. Moreover, the process of re-encrypting an entire column, or sometimes an entire database, when a key is breached may require an extensive amount of storage and processing resources. Also, individual users storing and accessing data from the column may also experience delays or interruptions when working.

Additionally, databases may be designed to store and manage data in a standardized format to aid in ensuring consistency and ease of access. Using different encryption algorithms for different types of data within the same column may break standardization, which may make it difficult for the database to manage and retrieve data efficiently. When databased indexes are used to provide quick access to specific data, indexes may become ineffective when different encryption algorithms are used within a common column.

In this way, managing multiple encryption keys and algorithms for different data types within the same column may become increasingly complex and cumbersome. In this context, each encryption key generally may need to be stored, tracked, and rotated, likely increasing the risk of key mismanagement and data exposure, and increasing the load on the network to manage the different encryption keys and algorithms. Thus, encrypting different types of data in the same column of a database using different encryption algorithms or keys may lead to data management challenges, performance issues, key management complexity, and diminished data integrity and security.

The present disclosure addresses the foregoing technical problems in the technical field of database management systems. More specifically, the present disclosure relates to implementing encryption and decryption methods for securing data in such systems by adding cryptographic key identifier data and cryptographic algorithm identifier data to a header of ciphertext. By embedding this identification data into the ciphertext header, data encrypted according to different encryption algorithms or based on different encryption keys may land in the same column without impacting the performance of access requests into the data. When new data lands into a column based on a new encryption key, the data flow may remain on while the system re-encrypts older data in the column using new encryption keys. In this way, data flows may avoid being temporarily disabled to update the column using new encryption keys. In a reciprocally similar manner, header-embedded decryption key identifiers and decryption algorithm identifiers may be utilized when requesting access to data. Therefore, the embodiments disclosed herein remove the delay and other latencies that may occur in the key rotation method of re-encrypting data in a column based on a new key.

Relatedly, access to data, via encryption or decryption keys and associated actions, may be controlled based on the ciphertext header—specifically allowing permitted entities control only to the encryption or decryption functions based on data contained in the ciphertext header. Additionally, by adding the key and algorithm identifiers to a ciphertext header, different types of data may be stored in or read/decrypted from the same column. Adding the identifiers may also allow data to be encrypted or decrypted uniquely based on data access control or security levels specified by external source permission information. Further, adding such identifiers may aid in encrypting and decrypting data individually—as opposed to in columns—allowing systems to remain functioning while data may be changed (i.e., decrypted using an existing key and re-encrypted with a new key), for example, due to original encryption keys and/or data being compromised in a data breach. These header-embedded key and algorithm identifiers may also eliminate the need to rely on external servers/databases to determine encryption and decryption keys and algorithms to use for encrypting or decrypting data, and thus reducing the likelihood of using incorrect keys to encrypt or decrypt data. Thus, applications and entities may no longer need to use external servers (e.g., the external KMS) for key management since access to column data may be allowed based on permissions indicated in ciphertext headers and active directories. For example, applications and entities need not use external servers in situations where access to an external server is costly or non-performant.

Thus, the embodiments disclosed herein increase processing and network capacity by permitting data encrypted in different manners (e.g., using different algorithms and keys) to be stored in the same column, such that entire columns and databases of data may not need to be immediately re-encrypted when a security breach occurs. Instead, the embodiments herein allow for the re-encryption of only the data entries that were previously encrypted using a breached key, thereby saving a vast amount of processing resources at the storage system.

In an embodiment, two different encryption algorithms and encryption keys may be used for encrypting data into the same column of a storage system based on two distinct encrypt access requests. These two different encrypt access requests may be received by an application of a storage system from the same external source or from other external sources. Such encrypt access requests may be received at the same, similar, or different times.

For example, in the case that multiple data sets may be requested to be stored in a single distinctly managed column with different encryption schemes, the application may first receive a first encrypt access request to encrypt a first data set to the database. The application may encrypt the first data set using a first encryption algorithm based on a first encryption key to obtain (e.g., generate) a first ciphertext. Next, the application may add to a first header a first encryption key identifier identifying the first encryption key and a first encryption algorithm identifier identifying the first encryption algorithm to the header of the first ciphertext. The preceding step may be followed by the application writing the first ciphertext to a column in the database.

Later, the application may receive a second encrypt access request to encrypt a second data set to the same database column where the first data set was stored. The application may encrypt the second data set using a second encryption algorithm (which may differ from the first encryption algorithm) based on a second encryption key (which may differ from the second encryption key) to obtain (e.g., generate) a second ciphertext. Then, the application may add a second header to the second ciphertext. This second header may comprise a second encryption key identifier identifying the second encryption key and a second encryption algorithm identifier identifying the second encryption algorithm—where the second encryption algorithm identifier and the second encryption key identifier may be different from the first encryption algorithm identifier and the first encryption key identifier. Finally, the application may encrypt the second ciphertext to the column in the database. In utilizing this method, the system may "comingle" data in a less resource- and time-intensive manner—improving overall network efficiency.

In another embodiment, a management, authorization, and encryption scheme may involve an external source sending an encrypt access request, including a data entry to be written across a set of distinctly managed columns to the database of a storage system, to an application of the storage system. First, to authenticate the external source, the application may determine whether the external source is permitted to access and encryption key to encrypt the data entry to the database by checking an active directory for an identifier of the external source and corresponding permissions associated with the external source. For example, if an external source sends an encrypt request to encrypt a specific type of data (e.g., customer social security number (SSN)), an application of the storage system may verify whether the external source has permission to encrypt the specific type of data (e.g., SSN) to the database based on a permission level of the external source indicated in the active directory.

When the application determines that the external source is permitted to encrypt the data entry to the database, the application may begin encrypting the data entry using the configured encryption algorithm and the specified encryption key to obtain (i.e., generate) ciphertext. The encryption key may be associated with a data type of the data entry included with the encrypt access request, a standard key associated with the database, or another predetermined key. The application may then add an encryption key identifier identifying the encryption key and an encryption algorithm identifier identifying the encryption algorithm to the ciphertext header. Finally, the application may write the ciphertext to a column in the database.

In another embodiment, a management, encryption, and decryption scheme may involve requesting access to data from a set of distinctly managed columns and decrypting based on identifiers of a ciphertext header. An external source may send a decrypt access request for a data entry comprising ciphertext from a database to an application of a storage system. Then, the application may initially determine whether the external source is permitted to read/decrypt the data entry from the database by checking an active directory for an identifier of the external source and corresponding permissions associated with the external source. For example, if an external source/user sends a decrypt access request to read/decrypt a specific type of data (e.g., customer SSN), an application of the storage system using an encryption function may verify/determine whether the external source/user has permission to read/decrypt the specific type of data (e.g., SSN) from the database based on a permission level of the external source indicated in the active directory.

Once the application determines that the external source is permitted to decrypt the data entry from the database, the application may begin reading the ciphertext from a column of the database. Then, the application may obtain (e.g., read) a decryption key identifier and a decryption algorithm identifier from a header of the ciphertext. The application may then decrypt the data entry from the ciphertext using a decryption algorithm identified by the decryption algorithm identifier based on a decryption key identified by the decryption key identifier. Finally, the application may transmit the data entry to the external source.

In various embodiments, write/encrypt and read/decrypt access requests to data storage may be handled separate from embodiments discussed herein. Such separate handling of write access requests and read access requests may allow access to encryption and decryption control outside of database management. References to active directories may be made in relation to embodiments of encryption. User access to encryption or decryption schemes may be granted based on membership in one or more active directories. These memberships in active directories may be referred to as security groups. Such security groups may align with encryption/decryption keys and data categories. For example, if there is a cryptographic key for SSN, there may also be a security group whose members can encrypt SSN data and a security group whose members can decrypt SSN data. In the event of a key rollover, the security group members may continue to maintain access because access may be granted to the security group or an attribute type associated with the cryptographic key.

In some embodiments, ciphertext header-based data security may take place in transit—that is, where there may be no data storage involved. Data may flow from a source through a data pipeline and an application may call encryption and decryption on the data during transit through the data pipeline to protect data in transit. There may also be functionality available to test if data is already encrypted and either update cryptographic keys "on the fly" (i.e., re-encrypt data, e.g., if more information about the data is known) or encrypt clear text data that may have arrived.

In some embodiments, encryption or decryption keys may be stored in various manners to further secure data and prevent breaches into the encryption or decryption keys. For example, this may be done by storing a master key in an entirely separate access database, either of the storage system or external to the storage system. In this way, the master key may not be compromised even if the encrypted data itself is compromised. Relatedly, in other embodiments, each database column may have a column-specific encryption key and a column-specific encryption algorithm. As such, these embodiments may further improve system efficiency and allow for platform-agnosticism.

In this way, the embodiments disclosed herein enhance the ciphertext to include the encryption/decryption key identifier and encryption/decryption algorithm identifier, both of which may be used to immediately identify the relevant encryption/decryption keys and algorithms for a dataset. By enhancing the ciphertext in this manner, the application at the storage system may not need to access other databases to perform encryption/decryption processes on data. In addition, the application may not need to reprogram data in a column of a dataset when a key breach occurs since the entries in the column may be independent from one another in terms of encryption/decryption Therefore, the embodiments disclosed herein reduce inefficiencies in the network, reduce the processing load on the network that would have otherwise been used for database encryption/decryption processes, reduce latencies in the storage of data in the storage system, and increase processing capacity at the storage system.

Turning now to FIG. 1, a communication system 100 is described. In an embodiment, communication system 100 comprises storage system 110, external source 130, and network 150. The components of the communication system 100 may be associated with one or more organizations or business enterprises. While the storage system 110 and external source 130 are shown as separate from network 150, in other embodiments, storage system 110 and external source 130 may be part of network 150, despite depiction outside of network 150 in FIG. 1. Network 150 may be one or more private networks, one or more public networks, or a combination thereof. Network 150 may comprise network elements (e.g., routers, switches, bridges, virtual private networks (VPNs), etc.) used for communications between storage system 110, external source 130, and other devices in the communication system 100.

External source 130 is a representative of one or more external sources that may access the data stored at the storage system 110 via a wired or wireless communication link to the network 150. External source 130 may be user equipment (UE), such as, for example, a personal computer, laptop, mobile phone, tablet, wearable device, etc. External source 130 may also be a computer system, server software, server hardware, or a collection of processors, memories, and/or networking resources. The external source 130 may implement a client application 134 to perform various functions, such as transmitting an access request 140 to write/encrypt or read/decrypt data at the storage system 110. For example, external source 130 may be embodied as a cloud-based system, which includes a client application 134 used to transmit the access request 140. Client application 134 may include instructions stored on a memory of the external source 130, which, when executed by a processor of the external source 130, may perform various steps and communications with the storage system 110. For example, client application 134 may transmit an access request 140 to the storage system 110. The access request 140 may be processed by data management application 124 of storage system 110, as further described herein.

Storage system 110 may be a computer system, server software, server hardware, or a collection of processors, memories, and/or networking resources used to implement data management application 124. For example, storage system 110 may be embodied as a cloud-based system, which may include one or more data stores and memories located together or separately across geographically disparate locations. As shown in FIG. 1, storage system 110 may include one or more databases 112A-N. Databases 112A-N may be logical data stores or repositories used to store and organize data within the storage system 110. Databases 112A-N of the storage system 110 may comprise tables 114A-N (respectively), each including rows and columns of data. For example, table 114A may comprise data entries in columns 116Aa-An, table 114B may comprise data entries in columns 116Ba-Bn, and so on, until table 114N, that may comprise data entries in columns 116Na-Nn. Each column 116Aa-An, 116Ba-Bn, and 116Na-Nn may contain various data entries and associated header metadata. An example of contents in the column 116Aa-An, 116Ba-Bn, and 116Na-Nn is depicted in and further described below with reference to FIG. 2.

Data management application 124 may include executable instructions stored at the storage system 110, for execution by one or more processors of the storage system 110. Data management application 124 may perform the steps and methods described herein to store data to or process requests for data stored at databases 112A-N of storage system 110. For example, data management application 124 may perform some or all of the steps of methods 300, 400, and 500 (depicted in FIGS. 3-5, discussed infra) unless an external source (e.g., external source 130) provides for the performance of such steps (e.g., via client application 134). Data management application 124 may also provide access to data when permitted and update data in accordance with policies, etc., as further described herein.

Figure 3:
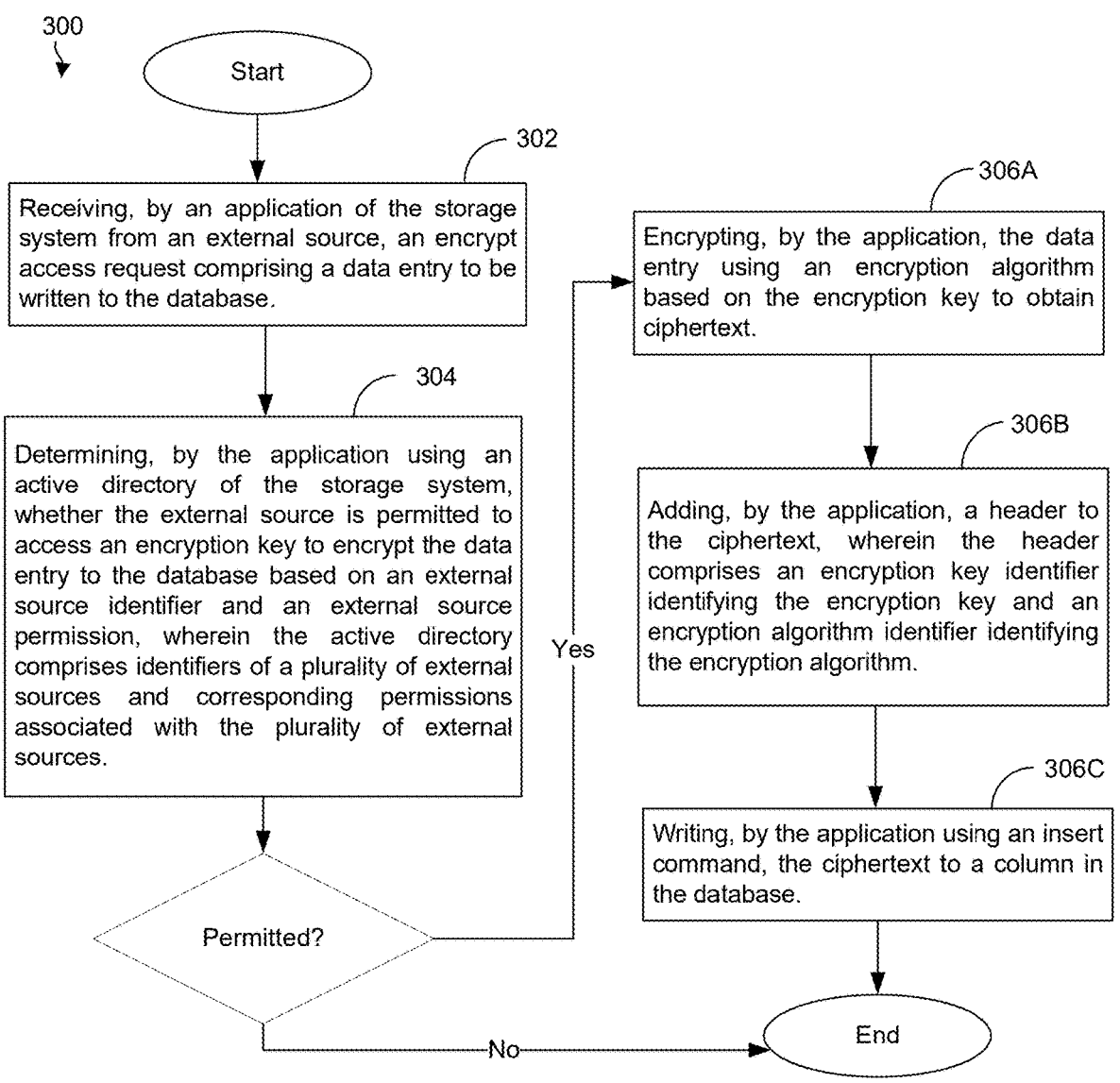
FIG. 3 is a flowchart of a method for managing, authorizing, and encrypting data to be stored across a set of distinctly managed columns in a database of a storage system.
Figure 4:
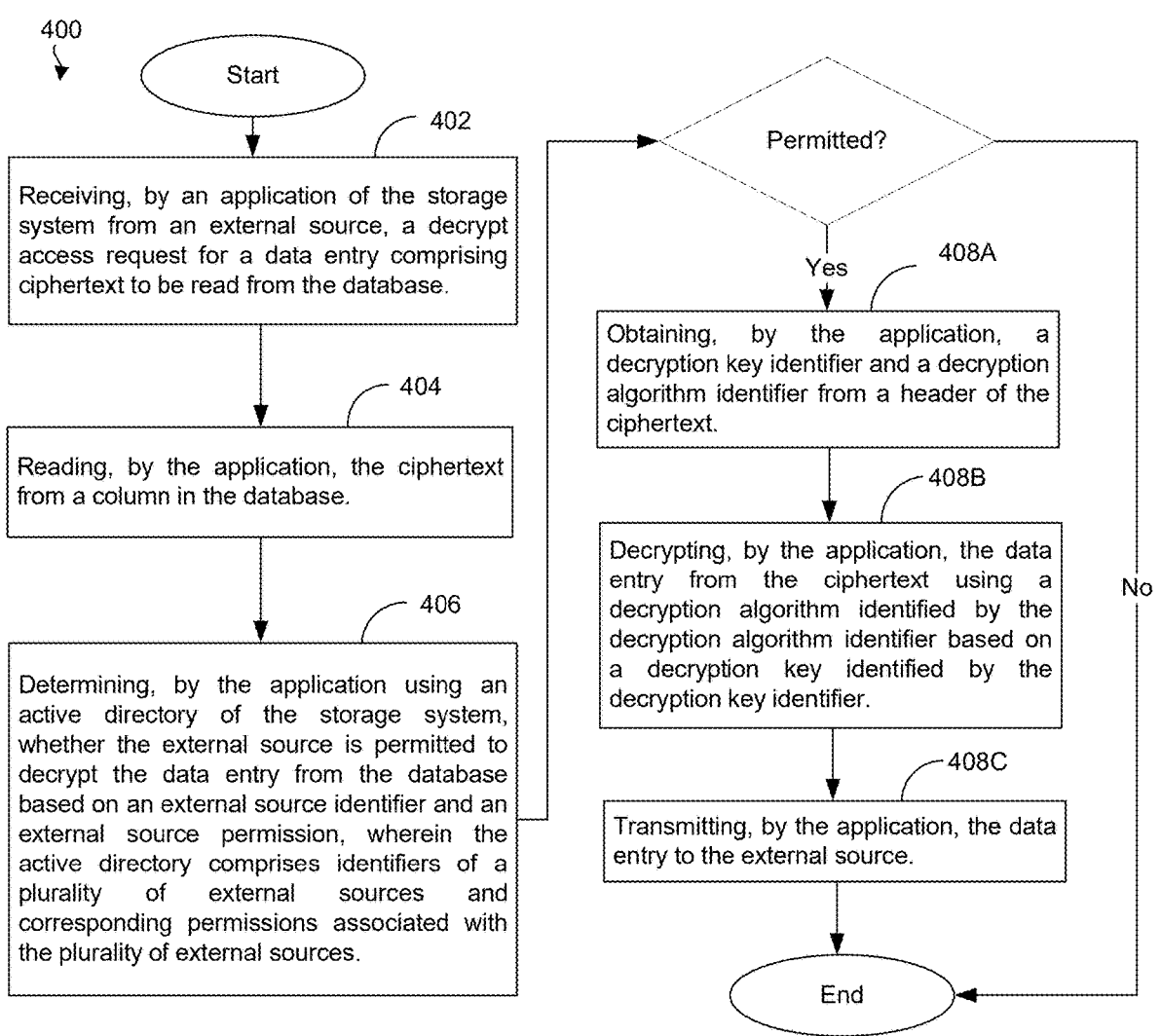
FIG. 4 is a flowchart of a method for managing, authorizing, and decrypting stored data across a set of distinctly managed columns from a database of a storage system.
Figure 5:
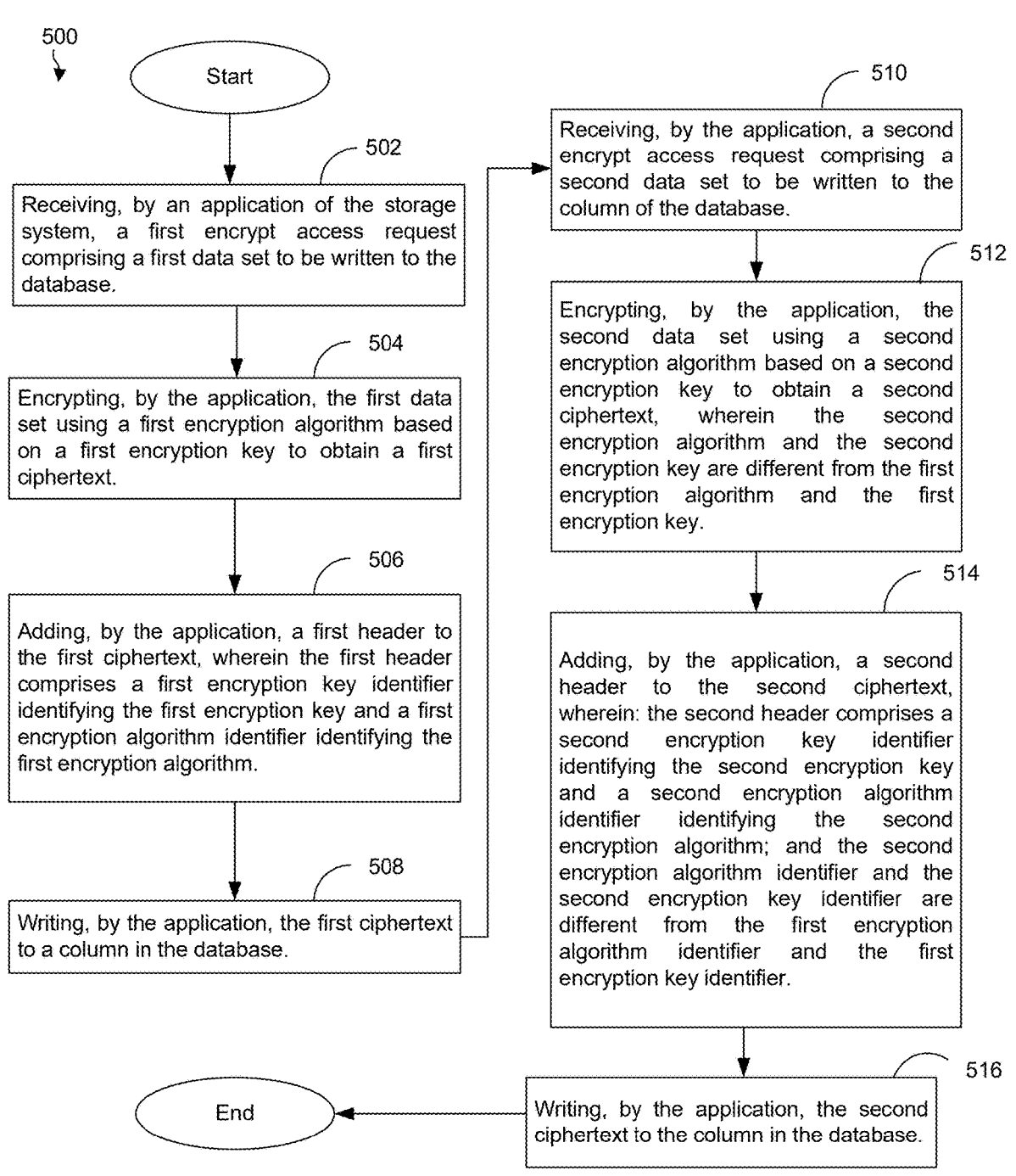
FIG. 5 is a flowchart of a method for maintaining a database comprising a plurality of distinctly managed columns on a storage system.

Active directory 126 of storage system 110 may store data and parameters associated with the databases 112A-N, which may be utilized by data management application 124 or client application 134 to perform methods 300, 400, and 500 (depicted in FIGS. 3-5, discussed infra). The data and parameters stored in the active director 126 may include, for example, lists of authorized users and groups, access permissions for users and groups, authentication methods, lists of shared folders accessible to specific users or groups, share permissions and quotas, access protocols supported (e.g., Server Message Block (SMB), Network File System (NFS), internet Small Computer System Interface (ISCSI)), data protection settings, network settings, general configuration settings, and/or any other information about databases 112A-N.

Figure 2:
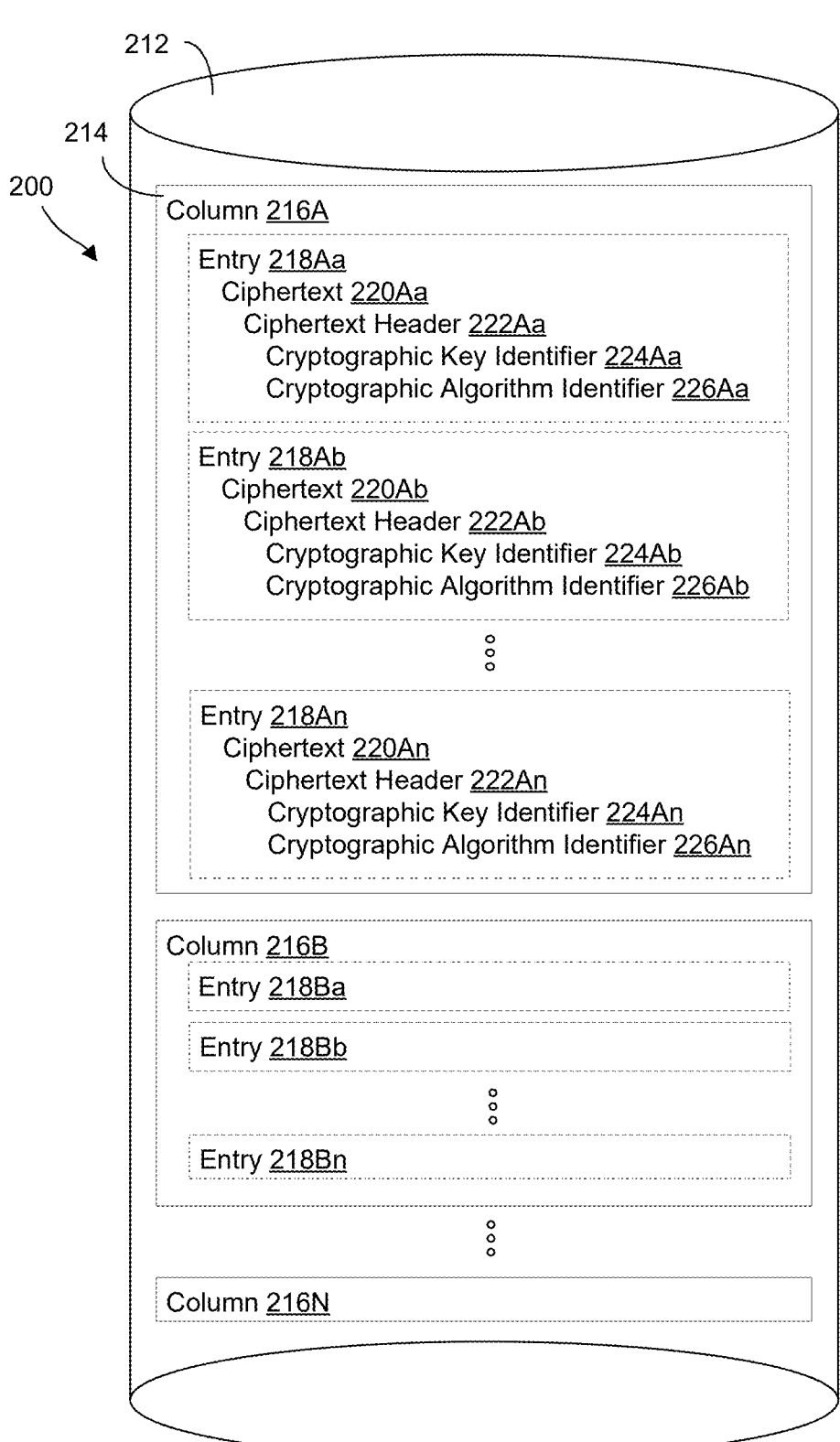
FIG. 2 is a block diagram of a database within a data storage system according to an embodiment of the disclosure.

Turning now to FIG. 2, a block diagram 200 of an exemplary embodiment of database 212 within a data storage system is shown. In various embodiments, database 212 may be similar to the databases 112A-N of storage system 110 in FIG. 1. For example, as with databases 112A-N, database 212 may be a logical data store or repository used to store and organize data. Database 212 may comprise table 214 including rows and columns of data. In an embodiment, table 214 may be similar to tables 114A-N of FIG. 1, in that table 214 also includes rows and columns of data. Thus, in a comparable manner to how table 114A may comprise data entries in columns 116Aa-An, table 214 may comprise data entries in columns 216A-N.

For example, column 216A may comprise data entries 218Aa-An. Further, data entry 218Aa may comprise ciphertext 220Aa, data entry 218Ab may comprise ciphertext 220Ab, data entry 218An may comprise ciphertext 220An, and so on, with each data entry 218Aa-An containing respective ciphertext. Similarly, column 216B may comprise data entry 218Ba, data entry 218Bb, data entry 218Bn, and so on, with each data entry 218Ba-Bn containing respective ciphertext (not depicted). Each ciphertext 220Aa-An of the data entries 218Aa-An may also comprise ciphertext headers 222Aa-An, which may include cryptographic key identifiers 224Aa-An (identifying cryptographic keys) and cryptographic algorithm identifiers 226Aa-An (identifying cryptographic algorithms). These cryptographic key identifiers 224Aa-An (and, thus, cryptographic keys) and cryptographic algorithm identifiers 226Aa-An (and, thus, cryptographic algorithms) may differ from one another. For example, ciphertext 220Aa may comprise ciphertext header 222Aa including a cryptographic key identifier 224Aa and a cryptographic algorithm identifier 226Aa, ciphertext 220Ab may comprise ciphertext header 222Ab including a cryptographic key identifier 224Ab and a cryptographic algorithm identifier 226Ab, ciphertext 220An may comprise ciphertext header 222An including a cryptographic key identifier 224An and a cryptographic algorithm identifier 226An, and so on—where each of the cryptographic key and algorithm identifiers may be different from one another.

Elaborating further, exemplary data entries 218Aa-An may comprise ciphertext 220Aa-An, each including ciphertext headers 222Aa-An (respectively). Each ciphertext header 222Aa-An may contain different cryptographic key identifiers 224Aa-An and different encryption algorithm identifiers 226Aa-An. For example, in column 216A, data entry 218Aa may contain a first encryption key identifier 224Aa and a first encryption algorithm identifier 226Aa in ciphertext header 222Aa of ciphertext 220Aa, designating a first encryption key and a first encryption algorithm (respectively) used to encrypt data entry 218Aa. In contrast, data entry 218Ab may contain a second encryption key identifier 224Ab and a second encryption algorithm identifier 226Ab in ciphertext header 222Ab of ciphertext 220Ab, designating a second encryption key and second encryption algorithm (respectively) used to encrypt data entry 218Ab. In this scenario, the first encryption key identifier 224Aa and first encryption algorithm identifier 226Aa may be the same or different from the second encryption key identifier 224Ab and the second encryption algorithm identifier 226Ab. Similarly, there may be additional data entries, for example, data entry 218Ac (not depicted), data entry 218Ad (not depicted), and so on to data entry 218An, with different encryption algorithm identifiers identifying different encryption algorithms and encryption key identifiers identifying different encryption keys, all being applied to different data entries 218Aa-An within the same column 216A.

Now referring to both communication system 100 in FIG. 1 and exemplary database embodiment in FIG. 2, it should be noted that in some contexts, respective columns of each database (e.g., columns 116Aa-An, 116Ba-Bn, 116Na-Nn, and 216A-N of databases 112A, 112B, 112N, and 212, respectively) may maintain column-specific cryptographic keys and/or column-specific cryptographic algorithms. Thus, in an embodiment, within a database, each of the different columns may be encrypted using different encryption keys and different encryption algorithms. Relatedly, different rows within a column may be encrypted using different cryptographic keys and different cryptographic algorithms such that the data being stored in each column may be encrypted differently.

In various embodiments, common encryption algorithms may include Advanced Encryption Standard (AES), Rivest-Shamir-Adleman (RSA), and Data Encryption Standard (DES). These algorithms may be used in a wide range of applications, including secure communications, data storage, and financial transactions. Symmetric-key encryption algorithms, such as AES, may use a single secret key for both encryption and decryption. Asymmetric-key encryption algorithms, such as RSA, may employ a pair of keys: a public key for encryption and a private key for decryption. Generally, encryption algorithms may be designed to be computationally expensive, which may make brute-force data decryption by unauthorized individuals or entities difficult.

Referring now to FIG. 3, shown is a method 300 for managing, authorizing, and encrypting data to be stored across a set of distinctly managed columns in a database of a storage system 110 according to various embodiments of this disclosure. Method 300 may be directed to the encrypting and landing of data in a column 116Aa-An, 116Ba-Bn, 116Na-Nn, or 216A-N (hereinafter referred to as column 116) of a database 112A-N or 212 (hereinafter referred to as database 112). In an embodiment, method 300 may be performed in communication system 100 by data management application 124 of storage system 110 and client application 134 of external source 130. Data management application 124 and/or client application 134 may be executed at a computer system (e.g., computer system 600 of FIG. 6, further discussed below).

At step 302, method 300 may first comprise receiving, by data management application 124 of the storage system 110 from an external source 130, an encrypt access request 140 comprising a data entry 218Aa-An, 218Ba-Bn, etc. (hereinafter referred to as data entry 218) to be written to the database 112. At step 304, method 300 may comprise determining, by data management application 124 using an active directory 126 (or access rules stored on database 112) of the storage system 110, whether the external source 130 is permitted to access an encryption key to encrypt data entry 218 to the database 112 based on an external source identifier and an external source permission. In an embodiment, the active directory 126 may comprise identifiers of a plurality of external sources and corresponding permissions associated with the plurality of external sources.

When it is determined that the external source 130 is permitted to access the encryption key to encrypt the data entry 218 to the database 112, method 300 may further comprise steps 306A-C. When the external source 130 is not permitted to encrypt the data entry 218 to the database 112, method 300 may end.

At step 306A, method 300 may comprise encrypting, by the data management application 124, the data entry 218 using an encryption algorithm based on the encryption key to obtain (e.g., generate) ciphertext 220Aa-An (hereinafter referred to as ciphertext 220). At step 306B, method 300 may comprise adding, by the data management application 124, ciphertext headers 222Aa-An (hereinafter referred to as header 222) to the ciphertext 220. The header 222 may comprise an encryption key identifier 224 identifying the encryption key and an encryption algorithm identifier 226 identifying the encryption algorithm. At step 306C, method 300 may then comprise writing, by the data management application 124 using an insert command, the ciphertext 220 to a column 116 in the database 112.

Method 300 may comprise various other steps and/or attributes not necessarily shown in FIG. 3. In an embodiment, the encrypt access request 140 may further comprise a data type identifier identifying a type of data included in the data entry 218 to be written to the database 212. A data type identifier may be used to specify a type of data (e.g., customer SSN) that a particular column 116 may store. Data type identifiers may aid in ensuring that data is stored and manipulated in a way that is compatible with intended use in a storage system 110, which may aid in error prevention. Further, data type identifiers may also facilitate the organization and retrieval of data within database 112.

In an embodiment, before encrypting, method 300 may further comprise obtaining, by data management application 124, the data type identifier to determine the encryption key and the encryption algorithm, in which the encryption key and the encryption algorithm are associated with the data type identifier and used to encrypt the data entry 218. In an embodiment, method 300 may further comprise adding, by data management application 124, the data type identifier to the header 222, in which the encryption key identifier 224 and the encryption algorithm identifier 226 are associated with the data type identifier. In an embodiment of method 300, the external source permission associated with external source 130 may indicate whether the external source 130 is permitted to at least one of access or write/encrypt to at least one of the column 116 or data entry 218.

In an embodiment of method 300, wherein the corresponding permissions in the active directory indicate at least one of: whether each of the plurality of external sources 130 are permitted to connect to the database 112, whether each of the plurality of external sources 130 are permitted to at least one of read/decrypt, write/encrypt, modify, or delete data within the database 112, access database scheme objects of the database 112, or perform administrative and database management tasks on the database 112. In an embodiment of method 300, the storage system may include a data store, which may comprise mappings between one or more encryption key identifiers 224 and one or more encryption keys as well as one or more encryption algorithm identifiers 226 and one or more encryption algorithms. In such an embodiment of method 300, the data management application 124 may access the data store to determine, based on mappings in the data store, the encryption key identifier 224 and the encryption algorithm identifier 226 to add to the header 222 of the ciphertext 220.

Turning now to FIG. 4, shown is a method 400 for managing, authorizing, and decrypting data to be stored across a set of distinctly managed columns in a database 112 of a storage system 110 according to various embodiments of this disclosure. Method 400 may be directed to the requesting of access to data in the storage system 110 and decrypting based on identifiers in ciphertext headers 222Aa- An (hereinafter referred to as header 222) of the requested data. In an embodiment, method 400 may be performed in communication system 100 by data management application 124 of storage system 110 and client application 134 of external source 130. Data management application 124 and/or client application 134 may be executed at a computer system (e.g., computer system 600 of FIG. 6, further discussed below).

At step 402, method 400 may first comprise receiving, by data management application 124 of the storage system 110 from an external source 130, a decrypt access request 140 for a data entry 218 comprising ciphertext 220Aa-An (hereinafter referred to as ciphertext 220) to be read from the database 112. At step 404, method 400 may comprise reading, by the data management application 124, the ciphertext 220 from a column 116 in the database 112.

At step 406, method 400 may comprise determining, by data management application 124 using an active directory 126 (or access rules stored on database 112) of the storage system 110, whether the external source 130 is permitted to read/decrypt the data entry 218 from the database 112 based on an external source identifier and an external source permission. In an embodiment, the active directory 126 may comprise identifiers of a plurality of external sources and corresponding permissions associated with the plurality of external sources.

When it is determined that the external source 130 is permitted to read/decrypt the data entry 218 from the database 112, method 400 may further comprise steps 406A-D. When the external source 130 is not permitted to decrypt the data entry 218 from the database 112, method 400 may end.

At step 408A, method 400 may comprise obtaining (e.g., reading), by the data management application 124, a decryption key identifier 224 and a decryption algorithm identifier 226 from a header 222 of the ciphertext 220. At step 408B, method 400 may comprise decrypting, by the data management application 124, the data entry 218 from the ciphertext 220 using a decryption algorithm identified by the decryption algorithm identifier 226 based on a decryption key identified by the decryption key identifier 224. At step 408C, method 400 may then comprise transmitting, by the data management application 124, the data entry 218 to the external source 130.

Method 400 may comprise various other steps and/or attributes not necessarily shown in FIG. 4. In an embodiment, the decrypt access request 140 may further comprise a data type identifier identifying a type of data included in the data entry 218 to be read/decrypted from the database 212. A data type identifier may be used to specify a type of data (e.g., customer SSN) that may be read/decrypted from a particular column 116. In an embodiment, before decrypting, method 400 may further comprise obtaining, by data management application 124, the data type identifier to determine the decryption key and the decryption algorithm, in which the decryption key and the decryption algorithm are associated with the data type identifier and used to decrypt the data entry 218. In such an embodiment, decrypting the data entry 218 may be performed based on the decryption algorithm and the decryption key associated with the data type identifier. In an embodiment, method 400 may further comprise obtaining, by data management application 124, the data type identifier from the header 222, in which the decryption key identifier 224 and the decryption algorithm identifier 226 are associated with the data type identifier. In an embodiment of method 400, the external source permission associated with external source 130 may indicate whether the external source 130 is permitted to at least one of access or read/decrypt from one of the column 116 or the data entry 218. These steps of method 400 may be performed by the data management application 124 or each of the respective databases 112A-N.

In an embodiment of method 400, the corresponding permissions in the active directory indicate at least one of: whether each of the plurality of external sources 130 are permitted to connect to the database 112, whether each of the plurality of external sources 130 are permitted to at least one of read/decrypt, write/encrypt, modify, or delete data within the database 112, access database scheme objects of the database 112, or perform administrative and database management tasks on the database 112. In an embodiment of method 400, the storage system may include a data store, which may comprise mappings between one or more decryption key identifiers 224 and one or more decryption keys as well as one or more decryption algorithm identifiers 226 and one or more decryption algorithms. In such an embodiment of method 400, the data management application 124 may access the data store to determine, based on the mappings in the data store, the decryption key and the decryption algorithm to use for decrypting the data entry 218 from the ciphertext 220.

Referring now to FIG. 5, depicted is a method 500 for maintaining a database 112 comprising a plurality of distinctly managed columns 114 on a communication system 100 according to various embodiments of this disclosure. Method 500 may be directed to the storing of multiple data sets in a single column 114 of a database using different encryption schemes. In an embodiment, method 500 may be performed in communication system 100 by data management application 124 of storage system 110 and client application 134 of external source 130. Data management application 124 and/or client application 134 may be executed at a computer system (e.g., computer system 600 of FIG. 6, further discussed below).

At step 502, method 500 may comprise receiving, by a data management application 124 of the storage system 110, a first encrypt access request 140 comprising a first data set 218 to be written to the database 112. At step 504, method 500 may comprise encrypting, by the data management application 124, the first data set 218 using a first encryption algorithm based on a first encryption key to obtain (e.g., generate) a first ciphertext 220.

At step 506, method 500 may comprise adding, by the data management application 124, a first header 222 to the first ciphertext 220. In an embodiment, the first header 222 comprises a first encryption key identifier 224 identifying the first encryption key and a first encryption algorithm identifier 226 identifying the first encryption algorithm. At step 508, method 500 may comprise writing, by the data management application 124, the first ciphertext 220 to a column 116 in the database 112.

At step 510, method 500 may comprise receiving, by the data management application 124, a second encrypt access request 140 comprising a second data set 218 to be written to column 116 of the database 112. At step 512, method 500 may comprise encrypting, by the data management application 124, the second data set 218 using a second encryption algorithm based on a second encryption key to obtain (e.g., generate) a second ciphertext 220. The second encryption algorithm and the second encryption key may be different from the first encryption algorithm and the first encryption key.

At step 514, method 500 may comprise adding, by the data management application 124, a second header 222 to the second ciphertext 220. The second header 222 may comprise a second encryption key identifier 224 identifying the second encryption key and a second encryption algorithm identifier 226 identifying the second encryption algorithm. The second encryption algorithm identifier 226 and the second encryption key identifier 224 may be different from the first encryption algorithm identifier 226 and the first encryption key identifier 224. At step 516, method 500 may comprise writing, by the data management application 124, the second ciphertext 220 to the column 116 in the database 112.

Method 500 may comprise various other steps and/or attributes not necessarily shown in FIG. 5. In an embodiment, method 500 may further comprise additional steps before the data management application 124 performs encryption. In such an embodiment, method 500 may further comprise authenticating one or more external sources 130 by determining, by data management application 124 using active directory 126 of data storage system 110, whether the one or more external sources 130 are permitted to encrypt to the database 112 based on a plurality of external source identifiers and external source permissions, in which the active directory 126 comprises identifiers of a plurality of external sources and corresponding permissions associated with the plurality of external sources. Then, only in response to determining, by the data management application 124, that the one or more external sources 130 are permitted to encrypt to the database 112, may the data management application 124 be allowed to encrypt to the database 112.

In an embodiment of method 500, the storage system may include a data store, which may comprise mappings between one or more encryption key identifiers 224 and one or more encryption keys as well as one or more encryption algorithm identifiers 226 and one or more encryption algorithms. In such an embodiment of method 500, the data management application 124 may access the data store to determine, utilizing mappings in the data store, the first encryption key identifier 224 and the first encryption algorithm identifier 226 to add to the first header 222 of the first ciphertext 220 as well as the second encryption key identifier 224 and the second encryption algorithm identifier 226 to add to the second header 222 of the second ciphertext 220.

Figure 6:
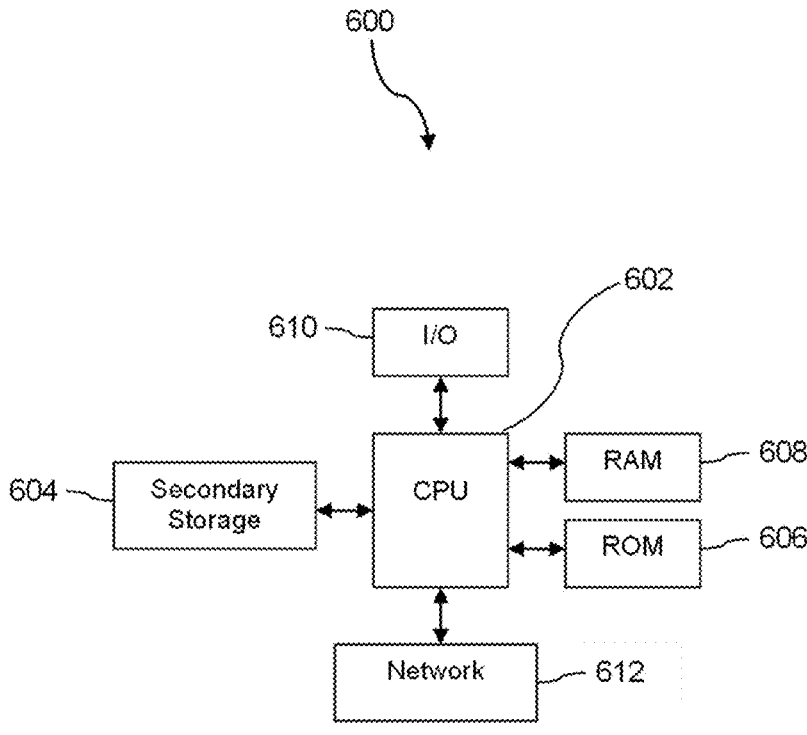
FIG. 6 is a block diagram of a computer system according to an embodiment of the disclosure.

FIG. 6 illustrates a computer system 600 suitable for implementing one or more embodiments disclosed herein. The computer system 600 includes a processor 602 (which may be referred to as a central processor unit or CPU) that is in communication with memory devices, including secondary storage 604, read-only memory (ROM) 606, random access memory (RAM) 608, input/output (I/O) devices 610, and network connectivity devices 612. The processor 602 may be implemented as one or more CPU chips.

It is understood that by programming and/or loading executable instructions onto the computer system 600, at least one of the CPU 602, the RAM 608, and the ROM 606 are changed, transforming the computer system 600 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application-specific integrated circuit (ASIC), because for large production runs the hardware implementation may be less expensive than the software implementation. Often a design may be developed and tested in a software form and later transformed, by well-known design rules, to an equivalent hardware implementation in an application-specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 600 is turned on or booted, the CPU 602 may execute a computer program or application. For example, the CPU 602 may execute software or firmware stored in the ROM 606 or stored in the RAM 608. In some cases, on boot and/or when the application is initiated, the CPU 602 may copy the application or portions of the application from the secondary storage 604 to the RAM 608 or to memory space within the CPU 602 itself, and the CPU 602 may then execute instructions that the application is comprised of. In some cases, the CPU 602 may copy the application or portions of the application from memory accessed via the network connectivity devices 612 or via the I/O devices 610 to the RAM 608 or to memory space within the CPU 602, and the CPU 602 may then execute instructions that the application is comprised of. During execution, an application may load instructions into the CPU 602, for example load some of the instructions of the application into a cache of the CPU 602. In some contexts, an application that is executed may be said to configure the CPU 602 to do something, e.g., to configure the CPU 602 to perform the function or functions promoted by the subject application. When the CPU 602 is configured in this way by the application, the CPU 602 becomes a specific-purpose computer or a specific-purpose machine.

The secondary storage 604 is typically comprised of one or more disk drives or tape drives and is used for non-volatile storage of data and as an over-flow data storage device if RAM 608 is not large enough to hold all working data. Secondary storage 604 may be used to store programs which are loaded into RAM 608 when such programs are selected for execution. The ROM 606 is used to store instructions and perhaps data which are read during program execution. ROM 606 is a non-volatile memory device which typically has a small memory capacity relative to the larger memory capacity of secondary storage 604. The RAM 608 is used to store volatile data and perhaps to store instructions. Access to both ROM 606 and RAM 608 is typically faster than to secondary storage 604. The secondary storage 604, the RAM 608, and/or the ROM 606 may be referred to in some contexts as computer-readable storage media and/or non-transitory computer-readable media.

I/O devices 610 may include printers, video monitors, liquid crystal displays (LCDs), touch screen displays, keyboards, keypads, switches, dials, mice, track balls, voice recognizers, card readers, paper tape readers, or other types of input devices.

The network connectivity devices 612 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 612 may provide wired communication links and/or wireless communication links (e.g., a first network connectivity device 612 may provide a wired communication link and a second network connectivity device 612 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC) and radio frequency identity (RFID). The radio transceiver cards may promote radio communications using 5G, 5G New Radio, or 5G LTE radio communication protocols. These network connectivity devices 612 may enable the processor 602 to communicate with the Internet or one or more intranets. With such a network connection, it is contemplated that the processor 602 might receive information from the network, or might output information to the network in the course of performing the above-described method steps. Such information, which is often represented as a sequence of instructions to be executed using processor 602, may be received from and outputted to the network, for example, in the form of a computer data signal embodied in a carrier wave.

Such information, which may include data or instructions to be executed using processor 602 for example, may be received from and outputted to the network, for example, in the form of a baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 602 executes instructions, codes, computer programs, scripts which it accesses from hard disk, floppy disk, optical disk (these various disk-based systems may all be considered secondary storage 604), flash drive, ROM 606, RAM 608, or the network connectivity devices 612. While only one processor 602 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 604, for example, hard drives, floppy disks, optical disks, and/or other device, the ROM 606, and/or the RAM 608 may be referred to in some contexts as non-transitory instructions and/or non-transitory information.

In an embodiment, the computer system 600 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by computer system 600 to provide the functionality of a number of servers that are not directly bound to the number of computers in computer system 600. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer-readable storage mediums having computer-usable program code embodied therein to implement the functionality disclosed above. The computer program product may comprise data structures, executable instructions, and other computer-usable program code. The computer program product may be embodied in removable computer storage media and/or non-removable computer storage media. The removable computer-readable storage medium may comprise, without limitation, a paper tape, a magnetic tape, a magnetic disk, an optical disk, a solid-state memory chip, for example analog magnetic tape, compact disk read-only memory (CD-ROM) disks, floppy disks, jump drives, digital cards, multimedia cards, and others. The computer program product may be suitable for loading, by the computer system 600, at least portions of the contents of the computer program product to the secondary storage 604, to the ROM 606, to the RAM 608, and/or to other non-volatile memory and volatile memory of the computer system 600. The processor 602 may process the executable instructions and/or data structures in part by directly accessing the computer program product, for example by reading from a CD-ROM disk inserted into a disk drive peripheral of the computer system 600. Alternatively, the processor 602 may process the executable instructions and/or data structures by remotely accessing the computer program product, for example by downloading the executable instructions and/or data structures from a remote server through the network connectivity devices 612. The computer program product may comprise instructions that promote the loading and/or copying of data, data structures, files, and/or executable instructions to the secondary storage 604, to the ROM 606, to the RAM 608, and/or to other non-volatile memory and volatile memory of the computer system 600.

In some contexts, the secondary storage 604, the ROM 606, and the RAM 608 may be referred to as a non-transitory computer-readable medium or a computer-readable storage media. A dynamic RAM embodiment of the RAM 608, likewise, may be referred to as a non-transitory computer-readable medium in that while the dynamic RAM receives electrical power and is operated in accordance with its design, for example during a period of time during which the computer system 600 is turned on and operational, the dynamic RAM stores information that is written to it. Similarly, the processor 602 may comprise an internal RAM, an internal ROM, a cache memory, and/or other internal non-transitory storage blocks, sections, or components that may be referred to in some contexts as non-transitory computer-readable media or computer-readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for managing, authorizing, and encrypting data to be stored across a set of distinctly managed columns in a database of a storage system, the method comprising:
    receiving, by an application of the storage system from a first external source, a first encrypt access request comprising a first data entry to be written to the database;
    determining, by the application using an active directory of the storage system, whether the first external source is permitted to access a first encryption key to encrypt the first data entry to the database based on a first external source identifier and a first external source permission, wherein the active directory comprises identifiers of a plurality of external sources and corresponding permissions associated with the plurality of external sources; and
    when the first external source is permitted to access the first encryption key to encrypt the first data entry to the database:
        encrypting, by the application, the first data entry using a first encryption algorithm based on the first encryption key to obtain first ciphertext;
        adding, by the application, a first header to the first ciphertext, wherein the first header comprises a first encryption key identifier identifying the first encryption key and a first encryption algorithm identifier identifying the first encryption algorithm; and
        writing, by the application, the first ciphertext to a column in the database.

2. The method of claim 1, wherein the first encrypt access request further comprises a data type identifier identifying a type of data included in the first data entry to be written to the database.

3. The method of claim 2, wherein before encrypting, the method further comprises obtaining, by the application, the data type identifier to determine the first encryption key and the first encryption algorithm, wherein the first encryption key and the first encryption algorithm are associated with the data type identifier and used to encrypt the first data entry.

4. The method of claim 2, further comprising adding, by the application, the data type identifier to the first header, wherein the first encryption key identifier and the first encryption algorithm identifier are associated with the data type identifier.

5. The method of claim 1, wherein the first external source permission associated with the first external source indicates whether the first external source is permitted to at least one of access or write/encrypt to at least one of the columns or the first data entry.

6. The method of claim 1, wherein the storage system includes a data store comprising mappings between:
    one or more encryption key identifiers and one or more encryption keys; and
    one or more encryption algorithm identifiers and one or more encryption algorithms.

7. The method of claim 6, wherein the data store is accessed, by the application, to determine, based on the mappings in the data store, the first encryption key identifier and the first encryption algorithm identifier to add to the first header of the first ciphertext.

8. The method of claim 1, further comprising:
    receiving, by the application from a second external source, a second encrypt access request comprising a second data entry to be written to the database;
    determining, by the application using the active directory, whether the second external source is permitted to access a second encryption key to encrypt the second data entry to the database based on a second external source identifier and a second external source permission; and
    when the second external source is permitted to access the second encryption key to encrypt the second data entry to the database:
        encrypting, by the application, the second data entry using a second encryption algorithm based on the second encryption key to obtain second ciphertext, wherein the second encryption algorithm and the second encryption key are different from the first encryption algorithm and the first encryption key;
        adding, by the application, a second header to the second ciphertext, wherein:
            the second header comprises a second encryption key identifier identifying the second encryption key and a second encryption algorithm identifier identifying the second encryption algorithm; and
            the second encryption algorithm identifier and the second encryption key identifier are different from the first encryption algorithm identifier and the first encryption key identifier; and
        writing, by the application, the second ciphertext to the column in the database.

9. The method of claim 8, wherein the storage system includes a data store comprising mappings between:
    one or more encryption key identifiers and one or more encryption keys; and
    one or more encryption algorithm identifiers and one or more encryption algorithms.

10. The method of claim 9, wherein the data store is accessed, by the application, to determine, utilizing mappings in the data store:
    the first and second encryption key identifiers and the first and second encryption algorithm identifiers to add to the first and second headers of the first and second ciphertexts, respectively; and the first and second encryption key identifiers and the first and second encryption algorithm identifiers to add to the first and second headers of the first and second ciphertexts, respectively.

11. The method of claim 1, comprising:

receiving, by the application from a second external source, a decrypt access request for a second data entry comprising a second ciphertext to be read from the database;

reading, by the application, the second ciphertext from the column in the database;

determining, by the application using the active directory, whether the second external source is permitted to decrypt the second data entry from the database based on a second external source identifier and a second external source permission; and when the second external source is permitted to decrypt the second data entry from the database:

obtaining, by the application, a decryption key identifier and a decryption algorithm identifier from a second header of the second ciphertext;

decrypting, by the application, the second data entry from the second ciphertext using a decryption algorithm identified by the decryption algorithm identifier based on a decryption key identified by the decryption key identifier; and transmitting, by the application, the data entry to the second external source.

12. The method of claim 11, wherein the decrypt access request further comprises a data type identifier identifying a type of data included in the second data entry to be decrypted from the database.

13. The method of claim 12, wherein before decrypting, the method further comprises obtaining, by the application, the data type identifier to determine the decryption key and decryption algorithm, wherein the decryption algorithm and the decryption key are associated with the data type identifier, and wherein decrypting the second data entry is performed based on the decryption algorithm and the decryption key associated with the data type identifier.

14. The method of claim 12, further comprising obtaining, by the application, the data type identifier from the second header, wherein the decryption key identifier and the decryption algorithm identifier are associated with the data type identifier.

15. The method of claim 11, wherein the second external source permission associated with the second external source indicates whether the second external source is permitted to at least one of access or read/decrypt from one of the columns or the second data entry.

16. The method of claim 11, wherein the corresponding permissions in the active directory indicate at least one of: whether each of the plurality of external sources are permitted to connect to the database, whether each of the plurality of external sources are permitted to at least one of read/decrypt, write/encrypt, modify, or delete data within the database, access database scheme objects of the database, or perform administrative and database management tasks on the database.

17. The method of claim 11, wherein the storage system includes a data store comprising mappings between:

one or more decryption key identifiers and one or more decryption keys; and one or more decryption algorithm identifiers and one or more decryption algorithms.

18. The method of claim 17, wherein the data store is accessed, by the application, to determine, based on the mappings in the data store, the decryption key and the decryption algorithm to use for decrypting the second data entry from the second ciphertext.

19. The method of claim 11, wherein the first external source and the second external source are the same.

20. The method of claim 8, wherein the first external source and the second external source are the same.

* * * * *